United States Patent [19]
Dooley

[11] Patent Number: 5,887,772
[45] Date of Patent: Mar. 30, 1999

[54] ANIMAL HARNESS WITH CARRYING MEANS

[76] Inventor: Robert Matthew Dooley, 4337 Wakefield Rd., Richmond, Va. 23235

[21] Appl. No.: 807,243

[22] Filed: Feb. 28, 1997

[51] Int. Cl.$^6$ .............................. A45F 5/00; A01K 27/00
[52] U.S. Cl. ...................... 224/191; 224/901.8; 224/905; 119/858; 119/907; D30/152
[58] Field of Search ................................ 224/905, 901.8, 224/191, 609, 649; 54/37.1; 119/858, 856; D30/152, 145

[56] References Cited

U.S. PATENT DOCUMENTS

| | | | |
|---|---|---|---|
| D. 313,677 | 1/1991 | Hammon et al. | D30/152 |
| D. 374,780 | 10/1996 | McLaughlin | D30/152 |
| 1,508,601 | 9/1924 | Huff | 119/856 |
| 4,848,624 | 7/1989 | Clem | 224/901.8 |
| 5,182,762 | 1/1993 | Nevitt | 224/148 |

*Primary Examiner*—Linda J. Sholl
*Attorney, Agent, or Firm*—John F. C. Glenn

[57] ABSTRACT

A dog harness having two straps down opposite sides of the dog is modified to add reachably attachable and detachable supply carrying means by use of hook and loop connections between the straps and a pair of sheets mounting pouches for carrying supplies. An additional sheet mounting additional pouches extends over the back of the dog behind the harness and is detachable attached by hooks and loops between the rear strap and a margin of the additional sheet where the rear strap overlaps said rear margin.

3 Claims, 5 Drawing Sheets

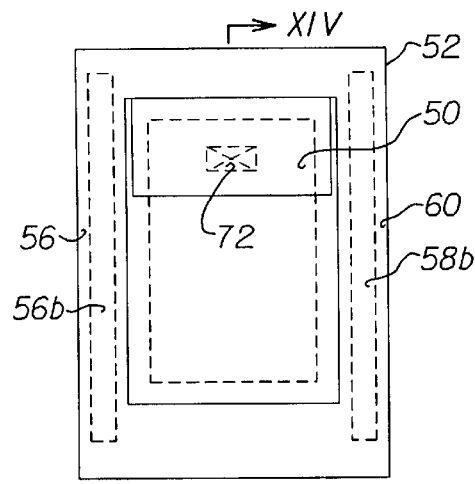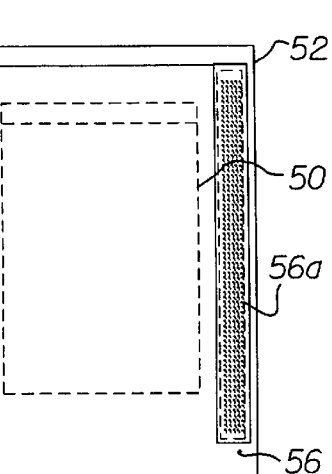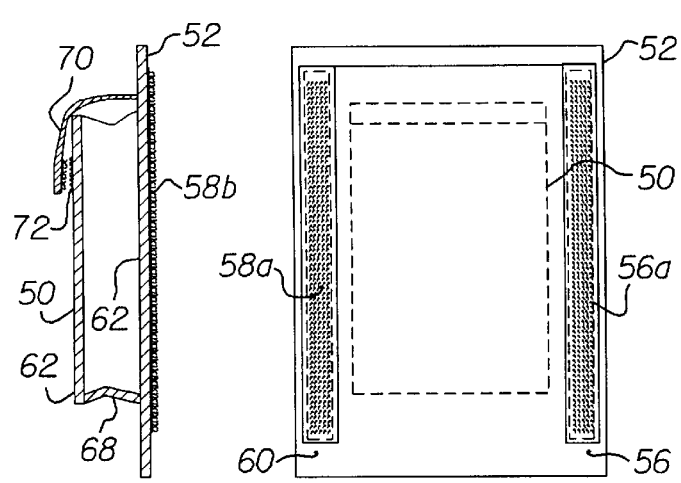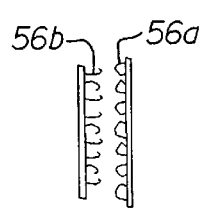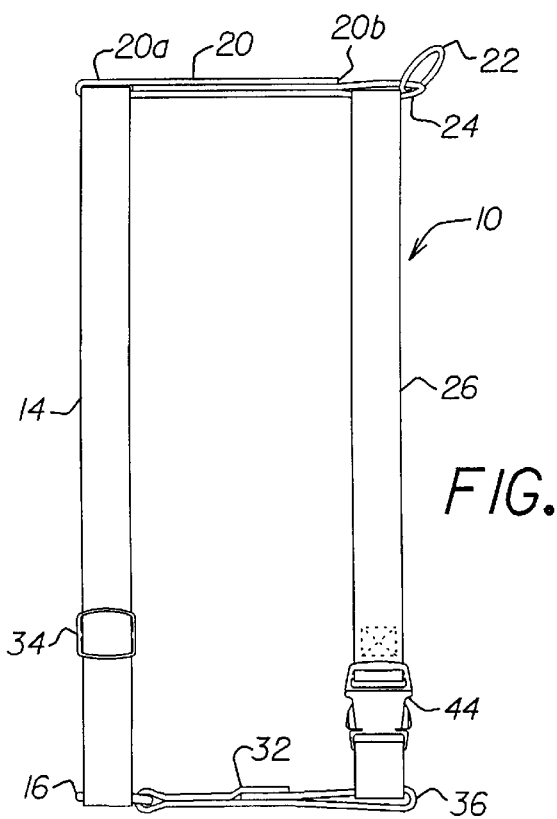
FIG. 13
FIG. 14
FIG. 15
FIG. 12
FIG. 3

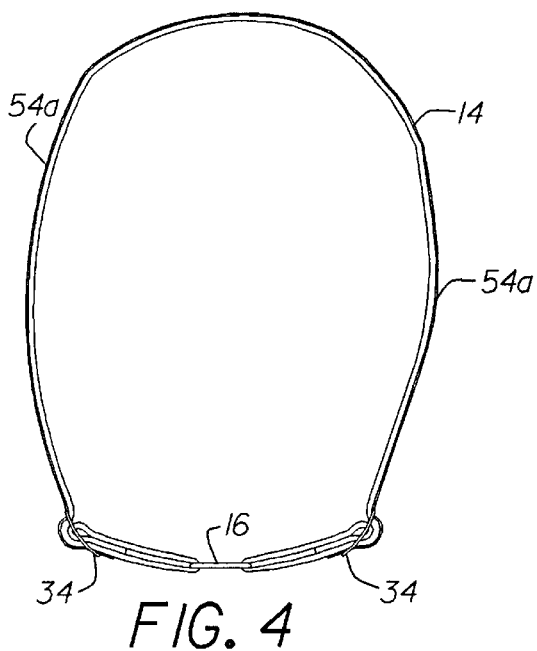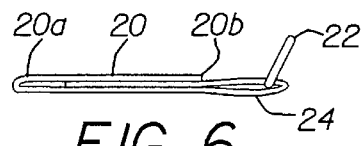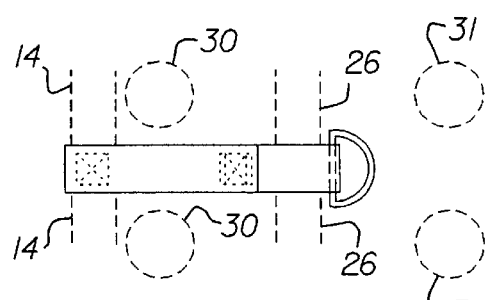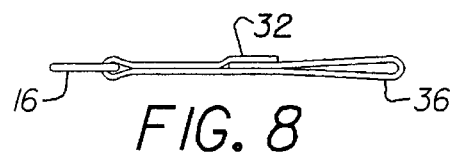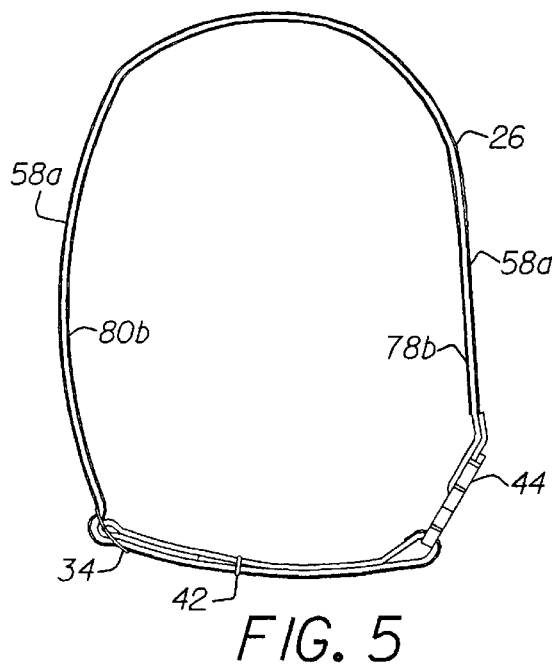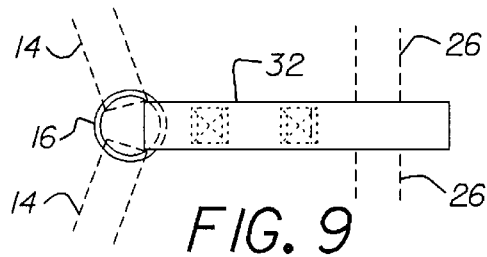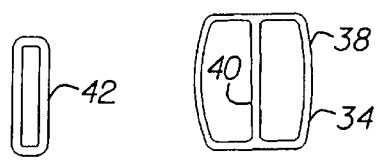

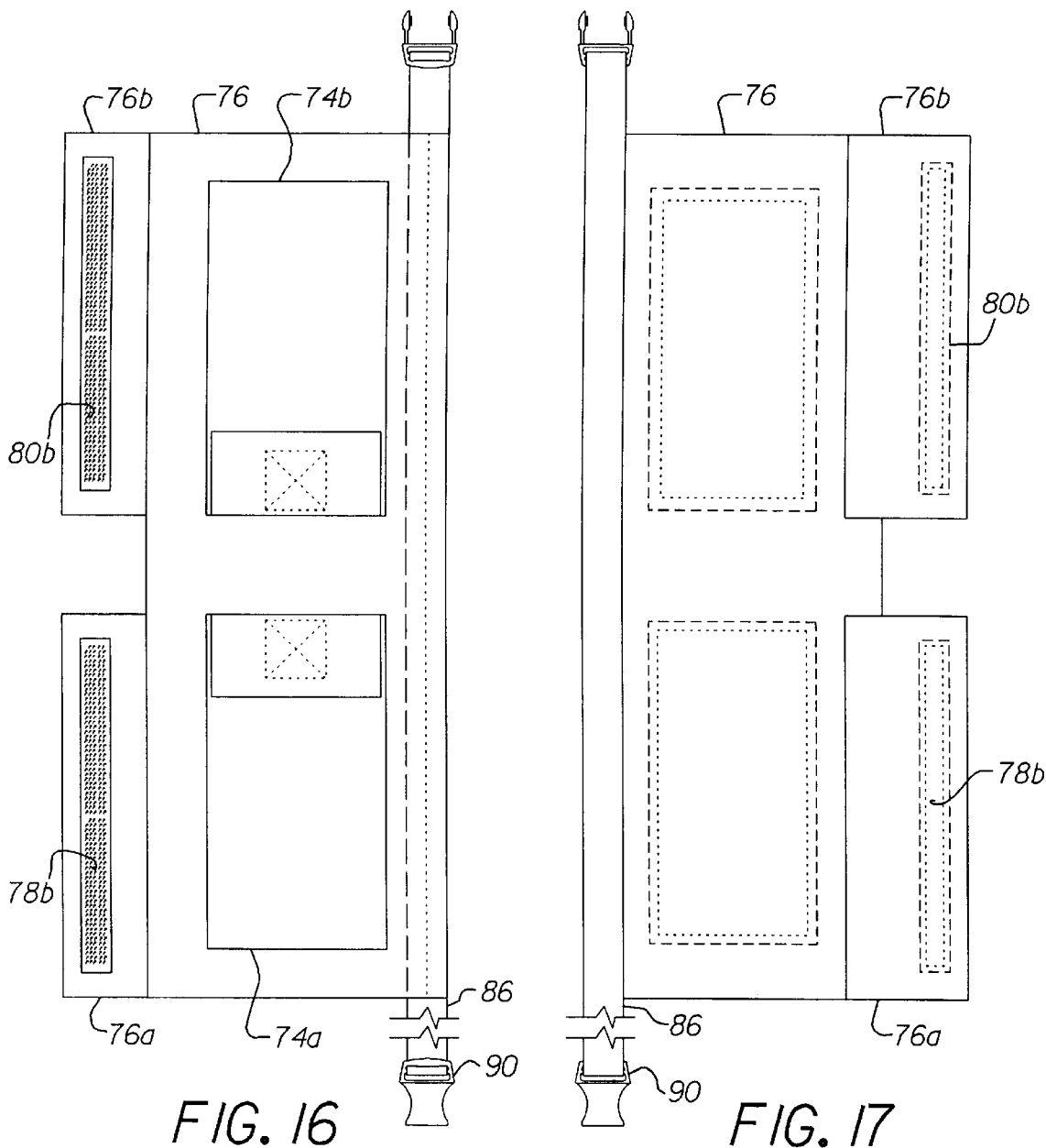

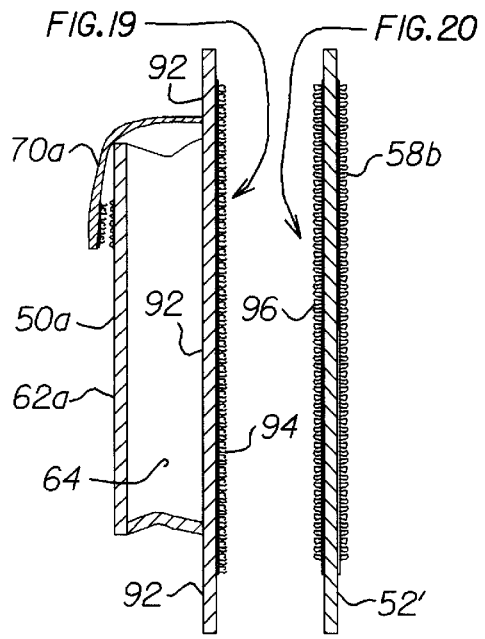
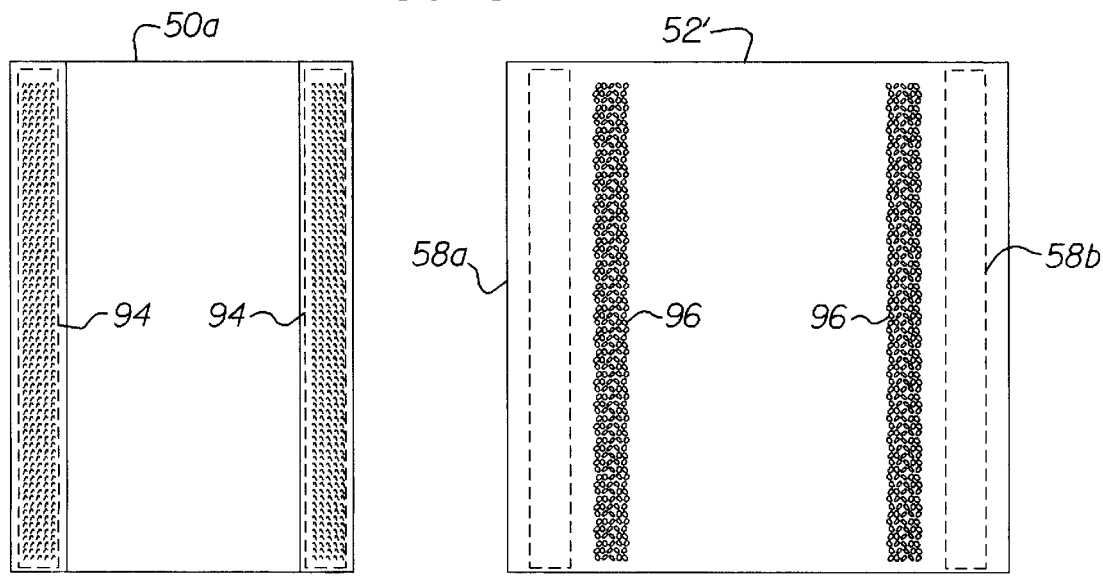
FIG. 18
FIG. 19       FIG. 20

5,887,772

ANIMAL HARNESS WITH CARRYING MEANS

FIELD OF THE INVENTION

Animal harnesses equipped for carrying.

BACKGROUND OF THE INVENTION

Harnesses with attached leashes are often used for controlling dogs when taking them on walks and on longer hikes when supplies may be needed. The idea of separately attaching several supply containers to a dog harness so that each container hangs by itself from a single strap of the harness is disclosed in U.S. Pat. No. 5,184,762 of Newitt, issued Feb. 9, 1993. Attaching a pair of packs of supplies to a connecting fabric that is placed over the top of a dog's harness to let the packs hang below on opposite sides of the dog, is disclosed in Design U.S. Pat. No. 313,677 of Hammond et al., issued Jan. 1, 1991. The connecting fabric rests on a piece of harness strap and extends down both sides of the dog where it is shown overlying but is not shown to be connected to two straps of the harness that extend in parallel spaced relation down the sides of the dog. Another piece of strap extends over and apparently can be moved toward the first piece of strap to hold the connecting fabric between them.

SUMMARY OF THE INVENTION

The present invention uses a known form of dog harness that has a strap passing between the front legs of the dog, which limits turning of the harness around the dog's body, and has a pair of spaced straps extending substantially vertically over each side of the dog's body. The invention adds carrier means extending between and detachably attached to both of the said spaced straps on each side of the dog. Each carrier means incorporates or is attached to something useful to a person with the dog; for example, supplies or a legally required document or sign, or a reflective or brightly colored or glowing surface. The preferred means for detachable attachment is hooks and loops which interlock when brought together but are capable of being peeled apart. The invention further provides for additional carrier means detachably attached behind the harness.

BRIEF DESCRIPTION OF THE DRAWINGS

FIG. 3 shows a side elevation of a conventional harness corresponding to the one shown on FIGS. 1 and 2 except for omission of any carrier sheet and pouch, as displayed hanging from a support (not shown).

FIG. 4 shows an enlarged front elevation of the forward harness strap shown around the dog in FIG. 1;

FIG. 5 shows a corresponding front elevation of the rear harness strap around the dog;

FIG. 6 shows an enlarged side elevation of the upper connecting strap between the straps shown in FIGS. 4 and 5;

FIG. 7 shows a top elevation of the connecting strap shown in FIG. 6, with phantom lines indicating where the forward and rear straps respectively pass around its forward and through its rear loops, and the positions of the dog's leg relative to these straps;

FIG. 8 shows an enlarged side elevation of the lower connecting strap of the harness;

FIG. 9 shows a top elevation of the lower connecting strap shown in FIG. 8, with phantom lines indicating where the forward and rear straps pass through it;

FIG. 10 shows an enlarged plan view of a ring shown in FIG. 4 around said forward strap;

FIG. 11 shows an enlarged plan view of the buckle shown in FIG. 5;

FIG. 12 shows a schematic side view of a pair of strips bearing hooks and loops which are interengageable when brought together (e.g., for closing the flap at the top of the pouch shown in FIG. 14);

FIG. 13 shows an enlarged view of the pouch shown in FIG. 2;

FIG. 14 shows a vertical section on the line XIV shown in FIG. 13;

FIG. 15 shows a rear view of the pouch shown in FIG. 13;

FIG. 16 shows a top plan view of an additional carrier sheet and pouches carried by it;

FIG. 17 shows the reverse side of the sheet shown in FIG. 16;

FIG. 18 shows a modified form of the carrier sheet and pouch shown in FIG. 14, while spaced apart to show added hook and loop strips for detachably holding them together when the strips are in contact;

FIG. 19 shows the back of the pouch shown in FIG. 18, as viewed from the position of the carrier sheet shown in that figure;

FIG. 20 shows the carrier sheet shown in FIG. 18, as viewed from the position of the pouch shown in that figure.

DETAILED DESCRIPTION OF THE ILLUSTRATED EMBODIMENTS

Figure 1:
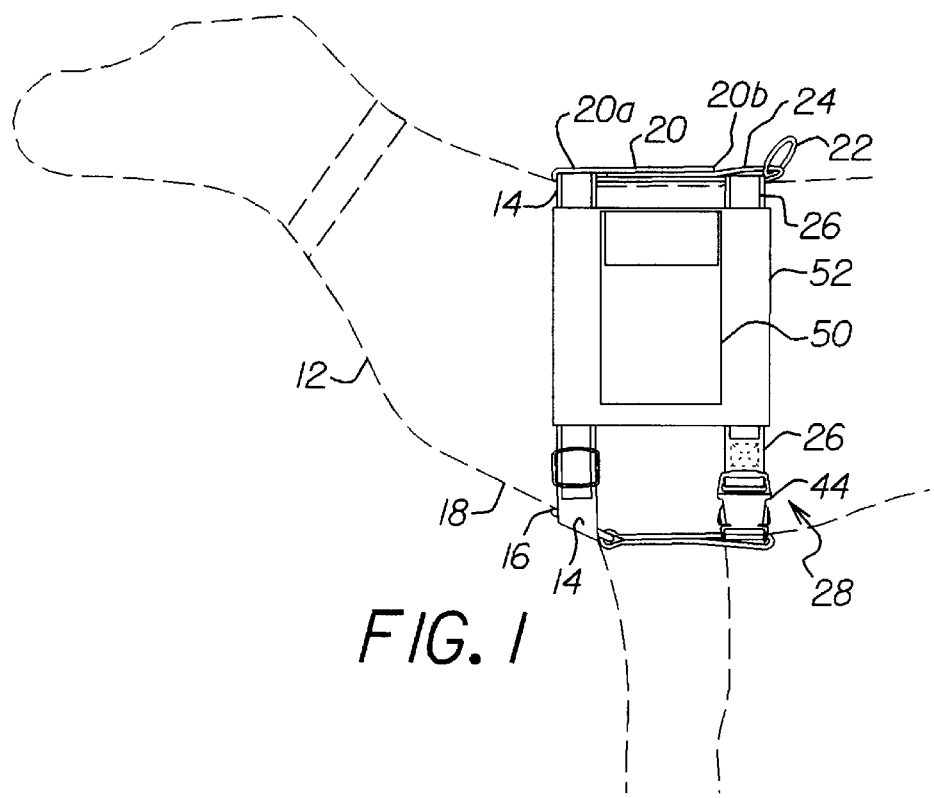
FIG. 1 shows a side elevation of a harness on a dog (shown in phantom lines) with a carrier sheet and pouch on the visible side of the harness.

A conventional dog harness 10 is shown in FIG. 3, and the following parts of it which appear elsewhere in the accompanying drawings are part of the conventional harness: A forward strap 14 has its ends connected to a metal ring 16 and extends in a circular path up from the ring 16 around the base of the dog's neck 18, and back to the ring 16. An upper connecting member 20 extends along the dog's back and has a forward end 20a and rear end 20b. The forward end 20a extends across and is sewn to forward strap 14. The rear end 20b holds a ring 22 for attachment to a leash, and also forms a loop 24 which slidably receives and holds a rear strap 26 extending around the dog's body 28 behind the dog's front legs 30 and ahead of the dog's hind legs 31. A lower connecting member 32 has a forward end 32a which grips ring 16, an intermediate portion passing between the dog's front legs 30, and a rear end 36 which forms a loop around and holding rear strap 26. The upper and lower connectors 20 and 32 serve to space straps 14 and 26 apart, even against pull on leash ring 22. Identical buckles 34 on straps 14 and 26 permit tightening these straps against dog 12. Each buckle 34 has a rigid rim 38 and an integral bar 40 across the rim. To install the buckle the belt is severed, one severed end is fastened to the bar 40, and the other end is passed through the opening on one side of the bar, around the bar, back through the opening on the other side of the bar, and pulled to shorten the effective length of the strap. The loose end of strap pulled from the buckle may be held down by a ring 42. An easily openable and closable snap-buckle 44 may be installed in rear strap 26 to help remove the harness from and put it back on the dog 12.

The accompanying drawings show modifications of the above-mentioned conventional harness in accordance with the invention as follows:

Referring now to FIGS. 1, 13 and 14, a pouch 50 for receiving and carrying supplies is secured to the outer side of a pouch carrier sheet 52 capable of extending between and overlapping straps 14 and 26 along one side of dog 12. A pair of mating strips 54a and -b are respectively secured to the outer face of strap 14 and to the opposite overlapping margin 56 of sheet 52, and a like pair of mating strips 58a and -b are respectively secured to the outer face of strap 26 and to the opposite overlapping margin 60 of sheet 52, thereby enabling sheet 52 to be attached to and detached from straps 14 and 26. The pairs of mating strips have individual elements which interlock and unlock progressively when attaching sheet 52 to and detaching it from straps 14 and 26, for convenient and rapid operation. In the present preferred embodiment of the invention such mating strips are those in which one strip is a fabric tape having one face supporting a mass of hooks and the other is a fabric tape having one face supporting rows of projecting loops to catch and hold the hooks. Such tapes are sold under the registered trademark "VELCRO" of Velcro USA Inc. of Manchester, N.H. Strips 54b and 58b preferably have loops and strips 54a and 56a have hooks. This is preferred because sheet 52 with strips 54b and 58b is more readily bent back to peel away from strips 54a and 58a on straps 14 and 26 than vice versa.

Also, since the straps 14 and 32 may happen to be drawn through buckles 34 with the strips 54a and 58a on them, it is better to have the relatively smooth and compressible hook material on them rather than the loop material. For purposes of the invention hooks and loops as the means of detachable attachment are distinctly easier to use and better in the field than alternatives such as zippers, snap-in buttons and regular buttons and buttonholes, though such alternatives could be used to attach sheet 52 to and detach it from straps 14 and 26.

Pouch 50 has a front panel 62, bottom 68, cover flap 70 and mating hook and loop materials 72 fixed to the back of the flap 70 and front of panel 62 to permit closing and reopening the flap. Carrier sheet 52 and pouch 50 are of flexible waterproof fabric, and pouch side walls 64, bottom 68 and cover flap 70 are secured to sheet 52 and enclose an area of sheet 52 which forms the back panel 63 of pouch 50.

A corresponding pouch and carrier sheet are similarly attached to the corresponding portions of straps 14 and 26 on the other side of dog 12, to permit equalizing the weight of the load on opposite sides of the dog.

The pouch 50 may be modified to be made separate from sheet 52 and detachably attached to it in the same manner that sheet 52 is detachably attached to strips 54 and 56. For example, as shown in FIGS. 18–20, a modified pouch 50a has a front panel 62a, side walls 64a and cover flap 70a corresponding to those numbered 62, 64 and 70 in FIG. 14, but has an integral back panel 92 substituted for the portion of sheet 52 having the area 63 of pouch 50. Each side margin of the back of panel 92 is secured to a strip 94 of loop bearing material which is detachably attachable to an opposite strip 96 of hook bearing tape secured to a carrier sheet 52' corresponding to sheet 52. An alternative modification is to make the carrier sheet detachably attachable to a load in other ways, such as by loops of tape sewn to the sheet to carry various different items that are retainable in the loops.

Figure 2:
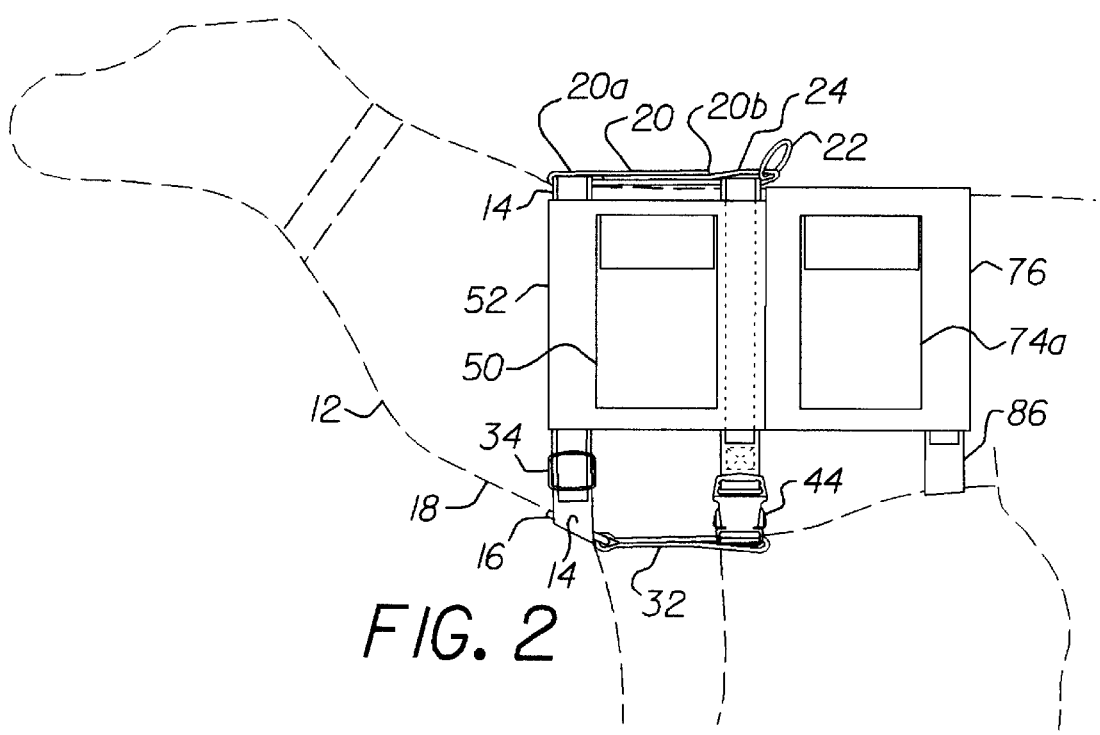
FIG. 2 repeats FIG. 1 with the addition of another carrier sheet supporting a pouch.

Referring now to FIGS. 2, 16 and 17, additional loads may be carried in pouches 74a and -b on a supplemental carrier sheet 76 placed over the back and both sides of dog 12 behind all of harness 10 except its rear strap 26. Sheet 76 has a pair of forward side margins 76a and -b which are respectively placed between the dog and portions of the rear strap 26 on opposite sides of the dog. A mating pair of hook and loop strips 78a and -b on one side of dog 12 and a like pair of mating strips 80a and -b on the other side of the dog are mounted between said margins 76a and -b and said portions of strap 26 in order to permit attaching carrier sheet 76 to and detaching it from strap 26. The strips 78a and 80a preferably support multiple hooks and are respectively secured to the underside of said portions of strap 26 on opposite sides of the dog. The strips 78b and 80b support projecting loops and are secured to the forward margins of sheet 76, on the side of the margins facing away from the dog, in position to be brought into face-to-face engagement with strips 78a and 80a when the margins are placed under strap 26. This can be done when harness 10 is on dog 12, sheet 76 is placed on the dog behind harness 10, and belt 26 is loosened to allow the sheet margins to be inserted under it and adjusted to bring the hooks of strips 78a and 80a into engagement with the loops of strips 78b and 80b to attach sheet 76 to strap 26; or this may be done while both harness 10 and sheet 76 are off the dog. In either case this may require drawing strap 26 through buckle 34 and ring 42 where strip 78a or 80a is on one side of strap 26 and strip 58a or its corresponding strip 58a' on the other side of the dog is on the other side of strap 26. However, the smoothness and compressibility of the hook material of these strips is such as to permit them to be drawn with the strap through such buckle and ring when loosening or tightening strap 26, in spite of having a pair of hook bearing strips mounted on opposite sides of strap 26. The fact that the underside of strap 26 is secured to hook bearing material may bring that material in contact with the dog. However, that has been found to present no problem of the hooks catching in the hairs of the dog, contrary to what imagination might suggest.

A pair of pouches 74a and 74b of the same general construction as pouch 50 for example, are mounted on carrier sheet 76 where it hangs on opposite sides of dog 12. All of the pouches on any of the carrier sheets may be of other construction or changed in number, size, shape or arrangement to accommodate different loads, which should be balanced equally on opposite sides of the dog.

To restrain the rear portion of sheet 76 during movement of the dog a strap 86 is secured to the rear margin of carrier sheet 76 and extends around the body of dog 12 ahead of its rear legs 31. A snap buckle 90 like the buckle 44 is secured to one end of strap 86 to connect its ends.

While present preferred embodiments and methods of practicing the invention have been illustrated and described, the invention is not limited thereto but may be otherwise variously embodied and practiced within the scope of the following claims.

I claim:

1. A harness and a pouch detachably attached to the harness, the harness comprising a first portion adapted to extend around a dog in the harness between its head and forelegs, a second portion adapted to extend around a dog in the harness between its forelegs and hindlegs, a third portion connected between the first two portions and adapted to extend between the forelegs of a dog in the harness, a fourth portion extending between and connected to the first and second portions and adapted to extend between them over the back of a dog in the harness, and means attached to the fourth portion and adapted to be detachably attached to a dog leash; the pouch comprising opposite side walls adapted to hold transportable things between them and one side wall of the pouch being adapted to face toward one side of a dog in the harness and to extend between said first and second harness portions; and means for detachably attaching the pouch to the harness comprising a first pair of mating components of which one component is secured to the pouch and the other component is secured to said first portion of the harness, and a second pair of mating components of which one component is secured to said second portion of the harness; and each said pair of mating components having part of one component facing and detachably attached to part of the part of the other component, whereby the pouch may be detached from the harness by detaching from each other the components of each of said pairs of components.

2. A harness and detachably attached pouch in accordance with claim 1, in which each of said pairs of components comprises a flexible strip of fabric bearing hooks and the other component of each pair comprises a flexible strip of fabric bearing loops engagable with said hooks.

3. A harness and detachably attached pouch in accordance with claim 2, and a supplemental pouch positioned in substantially side-by-side relation to the first pouch, at substantially the same level and to the rear of the first pouch, and means detachably attaching the supplemental pouch to the harness and first pouch.

* * * * *